ZERO AXIS CROSSING PULSE MODULATOR

Filed Dec. 30, 1960

INVENTOR
N. E. CHASEK
BY Roy M. Porter, Jr.
ATTORNEY 3,187,273
Patented June 1, 1965

3,187,273

ZERO AXIS CROSSING PULSE MODULATOR

Norman E. Chasek, Colts Neck, N.J., assignor to Bell Telephone Laboratories, Incorporated, New York, N.Y., a corporation of New York Filed Dec. 30, 1960, Ser. No. 79,817
4 Claims. (Cl. 332—1)

Figure 1:
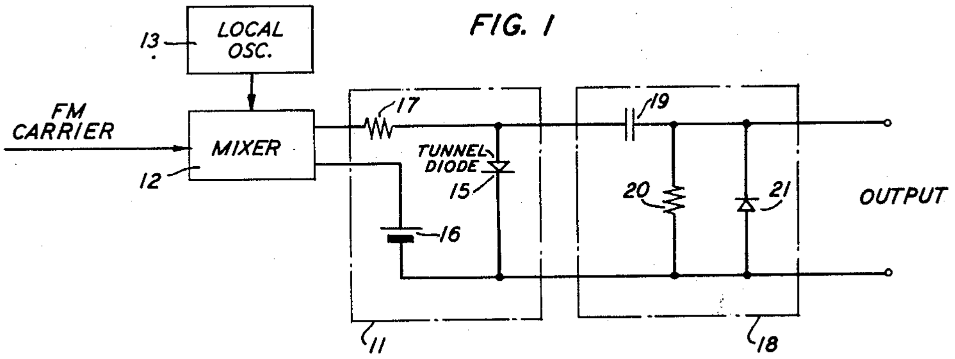

This invention relates to wave sampling apparatus and, in particular, to a modulator having application in pulse position modulation systems.

As is well known, in any of the basic forms of pulse modulation (as distinguished from pulse code modulation), be it pulse amplitude modulation (PAM), pulse duration modulation (PDM) or pulse position modulation (PPM), the message information is transmitted intermittently rather than continuously. A series of discrete pulses (unquantized code elements) rather than a continuously changing wave carries the specification of the message. A technique referred to as sampling or marking affords a means for representing a continuously varying modulating function by a series of single values or pulses.

Two basic virtues of pulse modulation systems reside in the ease with which a plurality of channels may be multiplexed by time-division (as distinguished from frequency multiplex division) and the improvement in the ratio of signal to noise (S/N) made possible in exchange for greater bandwidth. In certain applications, pulse modulation systems also afford better thresholds than frequency or phase modulation systems as will be considered in greater detail hereinafter.

With the advent of space satellite communications, a need has arisen for a microwave system in which an improvement in S/N may be easily obtained in exchange for an increase in bandwidth and, without experiencing any appreciable degradation in threshold.

FM with feedback appears to be one transmission system which basically satisfies the aforementioned requirements. Detracting from the virtues of such a system, however, is the fact that extremely wide band receiver circuits are required if the phase shift around the feedback loop is to be kept less than 180 degrees at unity gain. As the phase shift in such a feedback loop increases directly with the bandwidth of signal information to be transmitted, this imposes problems in circuit design for wide band signals, such as television, which are not easily resolved in practice.

A pulse position modulation system utilizing natural sampling of a frequency modulated carrier appears to give promise of satisfying the aforementioned requirements. Moreover, as will presently be seen, such a system is compatible with presently existing ground installed FM systems. As is known, pulse position modulation is a particular form of pulse-time modulation in which the value of each instantaneous sample of the modulating wave is caused to vary the position in time of a pulse relative to its unmodulated time of occurrence. The basic theorem applicable to all forms of pulse modulation states, in essence, that if a message that is a magnitude-time function is sampled instantaneously at regular intervals and at a rate which is twice the highest message frequency, then the samples will contain all of the information of the original message. By modifying this theorem slightly, it is seen that if every other zero crossing of a frequency modulated carrier (a frequency-time function), which is at a frequency at least twice the highest baseband frequency, could be accurately sampled or marked with a narrow pulse or spike, the resulting output pulse train would approximate a PPM wave.

Detracting from the many virtues of a PPM system heretofore has been the lack of suitable circuitry capable of precisely and directly sampling the zero axis crossings of a frequency modulated carrier at repetition rates in the megacycle range. Such rates are required for converting a broadband FM signal, such as a video signal of the order of 4 to 5 megacycles, to a PPM wave. Moreover, there has not been a simple, practical technique for producing pulses of extremely short width (i.e., finite rise and decay times), as is required in a PPM system to obtain tolerable values of S/N and threshold. As is well known, the width, rise and decay times of the pulses in a PPM system are critically determinative of the degree of noise and positional error encountered.

Accordingly, PPM modulators have been utilized heretofore primarily for converting from an amplitude modulated wave to PPM through periodic sampling of the magnitude of the wave. As the baseband in such applications is often of the order of only 3 to 15 kilocycles as for voice transmission, it has been relatively easy to sample the envelope at a repetition rate of twice the highest baseband frequency and then convert to PPM through the use of conventional pulse shaping and time delay circuitry. Blocking oscillators, sawtooth generators or Schmitt triggers have generally been employed in such pulse shaping circuitry.

The technique generally utilized heretofore for generating square waves directly from high frequency, sinusoidal waves has been to convert the sine wave into a square wave by alternately clipping, amplifying, clipping, etc., until pulses with the desired width, rise and decay times were obtained. Such an arrangement utilizing the most recent conventional fast-acting switching diodes, in conjunction with a differentiator, could possibly sample or mark the zero crossings of a radio-frequency carrier with relatively sharp spikes at megacycle repetition rates. However, there are a number of difficulties that arise with such an arrangement in addition to its complexity. Specifically, an array of square wave amplifiers and clippers connected in tandem gives rise to an appreciable amount of "even distortion" and "zero wandering" resulting from nonlinearities in the circuit components and from the necessity of having to pass the amplified square wave pulses through direct-current blocking capacitors before differentiating the optimized square wave. Also, variations in the time constants of the various square wave amplifiers and clipper circuits connected in tandem necessarily result in a certain degree of time lag or positional error, dependent both on the magnitude and frequency at the modulating function.

It is therefore a general object of this invention to provide precise, natural marking or sampling of the zero crossings of a radio-frequency carrier having a frequency in the megacycle range.

It is a more specific object of this invention to provide precise marking of every other zero crossing of a radio-frequency carrier frequency modulated by a broad baseband of signal information in a manner approximating a PPM wave.

It is a further object of this invention to produce an instantaneous time-varying rate of change in the carrier voltage waveform at every zero axis crossing such that the vertical sides of the waveform are effectively squared before differentiation. After differentiation, in further accord with this object, an output pulse train of extremely sharp spikes of large amplitude is produced, accurately marking the zero crossings of the carrier.

It is an additional object of this invention to provide a pulse position modulator of uniquely simple and practical design capable of marking the zero crossings of either a modulated or unmodulated carrier with extremely sharp spikes at repetition rates in the megacycle range.

In accordance with one aspect of this invention in one illustrative application, a zero axis crossing pulse position modulator comprises a mixer, a zero axis crossing trigger, a differentiator and a negative pulse clipper. The trigger comprises a tunnel diode biased near instability in a bistable manner. As a beat-down frequency modulated IF carrier from the output of the mixer is applied to the trigger and passes through zero into the positive half of each cycle, the tunnel diode switches from a high current-low voltage state to a low current-high voltage state. The diode is switched back to its alternate state when the carrier passes through zero into the negative half of each cycle. As this switching takes place in less than one nanosecond, the carrier voltage waveform is effectively amplified (as a result of the instantaneous time-varying rate of change in voltage of the carrier) for only an extremely short period of time in passing through zero. This, in effect, squares the vertical sides of the carrier voltage waveform and thereby results in very sharp spikes of large amplitude precisely marking every other zero axis crossing of the modified carrier when it is passed through the differentiator and negative pulse clipper. If the applied carrier is at a frequency at least twice the highest baseband frequency, successive positive pulses at the output of the clipper will approximate a pulse position modulated wave.

As used herein, the expression "modulator" connotes apparatus capable of either modulating, translating or demodulating a particular form of time-varying intelligence, these various functions of the modulator being determined solely by its position within a given transmission system. For example, at the transmitter end of a PPM system, the modulator embodied herein can translate the modulating intelligence which frequency modulates a radio-frequency carrier to a form of PPM. Conversely, at the receiving end of an FM system, the same modulator in conjunction with a low pass filter can comprise a demodulator. As such, it can replace the conventional FM discriminator.

The above-described zero axis crossing trigger and differentiator may also be utilized in any systems application wherein precise marking of the zero crossings of either a modulated, unmodulated or reconstructed carrier is desired, such as for timing or frequency control purposes.

Figure 2:
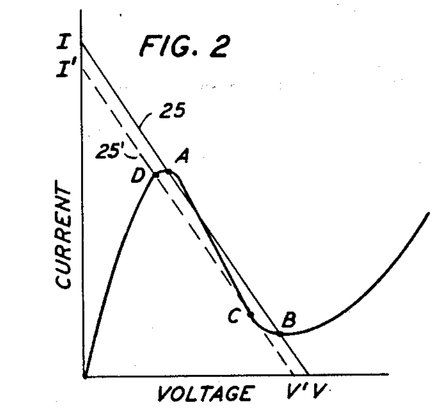
Figure 3:
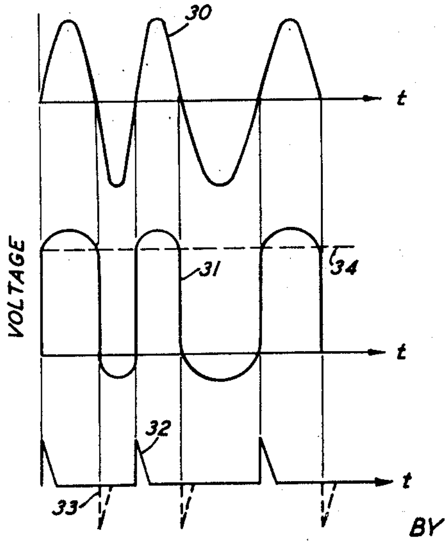

A complete understanding of the present invention and of the above and other features and advantages thereof may be gained from a consideration of the following detailed description taken in conjunction with the accompanying drawing, in which:

FIG. 1 is a schematic diagram illustrating a zero axis crossing pulse modulator having particular application as a pulse position modulator in accordance with the principles of the invention;

FIG. 2 illustrates the current-voltage characteristic curve of the negative resistance tunnel diode utilized in the modulator of FIG. 1 and, further, indicates one type of loading which advantageously biases the tunnel diode near instability such that bistable switching is effected when an applied carrier is applied thereto; and FIG. 3 depicts portions of three waveforms representing, respectively, a sinusoidal frequency modulated radio-frequency carrier applied to the modulator of FIG. 1, the applied carrier modified at the output of the zero axis crossing trigger circuit and a PPM pulse train approximating the originally applied carrier at the output of the modulator.

Referring now more particularly to FIG. 1, there is depicted in schematic diagram form a zero axis crossing pulse modulator particularly applicable for use in a pulse position modulation system. In such a system application, a mixer 12 shown in block form is utilized in combination with a local oscillator 13 to convert or beat down an applied frequency modulated carrier to a frequency at least twice the highest baseband frequency of the modulating intelligence. The modulating intelligence may now be converted from a frequency modulated wave to a pulse position modulated wave by the marking of every other zero crossing of the carrier with a pulse or spike in accordance with the invention.

The zero axis crossing trigger circuit 11 comprises a tunnel diode 15 biased in the forward direction by means of a direct-current voltage source 16 and a load resistor 17. As such, the positive terminal of the voltage source 16 is connected through the mixer 12 to the anode side of the tunnel diode. The particular choice of load resistance and direct-current bias for the trigger circuit will be considered in conjunction with an examination of the physical and electrical properties of tunnel diodes hereinafter. Similarly, the effect of superimposing an alternating bias on the direct-current bias of the tunnel diode in accordance with the invention will also be considered hereinafter during the description of the operation of the pulse modulator. A combination of a differentiator and negative pulse clipper circuit 18 is connected in tandem with the zero axis crossing trigger circuit 11. Circuit 18 comprises a capacitor 19 with a resistor 20 and a conventional diode clipper 21 shunting the output terminals of the modulator as so designated. With the anode of the clipper diode connected to the output side of the capacitor 19, only negative voltage pulses will cause the diode to conduct. This presents a low resistance path for the negative voltage pulses and, thus, effectively removes or clips them from the output PPM pulse train. In the interest of simplicity, the well known circuit details for isolating the radio-frequency sections from the direct-current sections of the modulator have been omitted.

Before considering the operation of the modulator, a brief examination of the properties and characteristics of tunnel diodes, in general, may prove beneficial.

The tunnel diode basically comprises a p-n junction having an electrode connected to each region thereof, and to this extent, is very similar in construction to other semiconductor diodes used for such various purposes as rectification, mixing and switching. The tunnel diode, however, requires two unique characteristics of its p-n junction; one is that it be narrow (the chemical transition from n-type to p-type region must be abrupt), of the order of 100 angstrom units in thickness, the other is that both regions be degenerate (i.e., contain very large impurity concentrations, of the order of $10^{19}$ per cubic centimeter). For a more detailed discussion of the solid state physics of the tunneling process which gives rise to the negative resistance characteristics of these diodes, reference is made to an article entitled "New Phenomenon in Narrow Germanium P-N Junctions," by L. Esaki, Physical Review, volume 109, January–March 1958, pages 603–604.

Because of its unique physical make-up, the tunnel diode offers many advantages over other two-terminal devices as well as over prior art negative resistance devices, such as the dynatron and point contact transistor in the common-emitter configuration. These include: reliability, high frequency capability, low noise properties and extremely small negative time constants, to mention but a few. The latter characteristic in particular is made use of in this invention, as will presently be seen.

With the components of the circuit of FIG. 1 thus described, the operation thereof in accordance with one illustrative application will now be considered. As employed in the pulse position modulator embodied herein, the diode is biased such that a load line 25 intersects the I–V curve thereof at two stable points designated A and B. The tunnel diode is thus biased near instability at point A in a bistable manner, with an initial direct-current biasing voltage V applied to the zero axis trigger circuit. When an incremental value of positive voltage from the output of the mixer is applied to the forward biased tunnel diode 15, such as when a frequency modulated carrier passes through its zero axis into the positive half of each cycle, the tunnel diode is switched or triggered such as from the first stable point A to point B along the I–V curve of FIG. 2. Conversely, a small negative voltage, such as established after the carrier passes through its zero axis into the negative half of each cycle, will shift the load line from 25 to 25', for example, and trigger the diode from point B to C and then back to its first or alternate stable region at point D on the I–V curve. As this switching advantageously may be made to take place in less than one nanosecond with many of the commercially available types of tunnel diodes, switching from one state to the other will normally take place in only a fractional part of the rise-time and decay-time of the carrier voltage waveform. Such extremely rapid bistable switching of the tunnel diode 15 at every zero crossing of the carrier causes a very abrupt, time-varying rate of change in voltage which effectively "squares" the vertical sides of the carrier voltage waveform. Concomitantly, this effective squaring of the carrier waveform assures precise marking of at least every other zero axis crossing thereof upon differentiation.

As is well known, the derivative of a square wave is a waveform which is uniformly zero except at the points of discontinuity. At these points, precise differentiation (finite time constant) would yield pulses of infinite amplitude, zero width and alternating polarity. The importance of "squaring" a sinusoidal waveform before differentiation so as to produce a succession of very narrow spikes of large amplitude is therefore quite obvious.

With the tunnel diode biased as depicted in FIG. 2, it is seen that the slightest positive increase in bias voltage will trigger the diode from point A to point B. This assures precise marking of every other zero crossing of an applied carrier, for example, when the waveform thereof passes through zero from the negative to the positive half of each cycle. In switching from point B to C to D with load line 25, however, a negative voltage of a value slightly larger than V–V' is required. As such, the diode will not precisely mark the zero axis crossings of an alternating voltage when the waveform thereof passes through zero from the positive to the negative half of each cycle. This is not important in PPM applications, as only the alternate, positive spikes at the output of the zero axis crossing trigger circuit 15 are utilized. However, if precise marking of every zero axis waveform crossing is desired, such as for timing or frequency control applications, this is easily accomplished by altering the load line slightly through a change in direct-current bias and load resistance. For example, if a load line is chosen such that it has a slope almost coinciding with the negative resistance portion of the I–V curve, an incremental change in bias voltage in either the positive or negative direction will trigger the tunnel diode and, thus, effect precise marking of every zero axis crossing of an alternating voltage applied to the trigger circuit.

In order to appreciate more fully the manner in which the pulse modulation circuit of FIG. 1 initially modifies a sinusoidal carrier and then precisely marks every other zero crossing thereof, reference is made to the curves of FIG. 3. By way of example, curves 30 and 31 represent, respectively, several cycles of a frequency modulated carrier voltage waveform with respect to time before and after passing through the zero axis crossing trigger circuit 11 of FIG. 1. The solid-line positive pulse train 32 is produced upon passing the modified carrier (waveform 31) through the differentiator and negative pulse clipper circuit 18. The dash-line negative pulses 33 are shown to indicate how they would appear in relation to the positive pulses if the diode clipper 21 was deleted, for example, for the purpose of marking every zero crossing of an applied carried. Close examination of curve 31 reveals that the unique zero axis crossing trigger circuit effectively amplifies and, thereby, squares the vertical sides of the carrier voltage waveform for only an extremely short period of time. The effectively squared portion of the carrier voltage waveform is indicated between the time axis and the dot-dash line 34. Since the actual rise and fall time of each half cycle of the carrier between the time axis and the dot-dash line 34 is so small, there has been no attempt to show this in the drawing. As a tunnel diode has a very low resistance when biased in the reverse direction, the voltage across the diode is essentially zero during the negative half cycle of the applied voltage as indicated in curve 31.

A direct linear relationship does not continuously exist between the frequency and the period of successive cycles of a frequency modulated wave. Accordingly, a certain amount of distortion may arise from zero axis crossing sampling of an FM wave when demodulated in a standard PPM demodulator. Such distortion may be substantially minimized or eliminated by either predistorting the original FM signal wave at the transmitter end or post-distorting the demodulated PPM wave at the receiver end of a given transmission system in a conventional manner.

A low pass filter may also be utilized to demodulate the PPM signal. This eliminates the distortion that arises in the standard demodulator. With this type of demodulator, higher order sidebands may fall into the baseband region and produce a different form of noise and crosstalk. The amplitude of these sidebands is dependent on the index of the modulating signal and on the ratio of the sampling rate to the highest baseband frequency. However, due to the low average index and the use of only a part of the total available baseband generally employed for multiplex telephony, this demodulation scheme can equally be made feasible when utilized with the PPM modulator embodied herein.

It is to be understood that the specific embodiment described herein is merely illustrative of the general principles of the instant invention. For example, the zero axis crossing trigger circuit in conjunction with the differentiator could be utilized to mark precisely either every zero crossing or alternate zero crossings of an unmodulated as well as a reconstructed carrier for purposes of timing or frequency control in many circuit applications. Similarly, any other negative resistance element exhibiting characteristics similar to those of the tunnel diode may also be utilized. Obviously, numerous other structural arrangements and modifications, as well as applications therefor, may be devised in the light of this disclosure by those skilled in the art without departing from the spirit and scope of this invention.

What is claimed is:

1. A pulse position modulator comprising a zero axis crossing trigger, a differentiator and a negative pulse clipper connected in tandem, said trigger comprising a negative resistance active element biased near instability with a direct-current bias and resistive load to be bistable, a first stable state exhibiting high current-low voltage and a second stable state exhibiting low current-high voltage characteristics, means for superimposing a frequency modulated carrier on the direct-current bias applied to said active element, said carrier having a magnitude sufficent when passing through zero into the positive half of each cycle to trigger the active element from said first state to said second state and when passing through the negative half of each cycle to trigger said active element back to said first state, each zero axis triggering of said active element causing an abrupt time-varying rate of change in said carrier voltage which effectively squares the vertical sides of the carrier voltage waveform at each zero crossing, said carrier with the effectively squared waveform producing a train of very sharp positive spikes of large amplitude accurately marking every other zero crossing of said carrier and approximately a natural sampled pulse position modulated wave when it is passed through said differentiator and said negative pulse clipper.

2. A pulse position modulator in accordance with claim 1 wherein said negative resistance active element comprises a tunnel diode.

3. A pulse position modulator in accordance with claim 1 wherein said negative resistance active element comprises a tunnel diode and including a local oscillator and a mixer preceding said zero axis crossing trigger for beating down said applied frequency modulated carrier to an intermediate frequency at least twice the highest frequency of the modulating function of said frequency modulated carrier.

4. A pulse position modulator for converting an applied frequency modulated signal to a pulse position modulated signal which comprises, in combination: a negative resistance active element; means including a direct current bias source and a resistive load in circuit relation with said negative resistance active element for biasing said active element near instability in a bistable configuration such that a first stable state exhibits a high current-low voltage characteristic and a second stable state exhibits a low current-high voltage characteristic; means including a source of frequency modulated signals for superimposing on said direct current bias applied to said active element an alternating voltage of sufficient magnitude when passing through zero into the positive half of each cycle to trigger said active element from said first stable state to said second stable state and when passing through zero into the negative half of each cycle to trigger said active element back to said first stable state; means responsive to transitions from said first stable state to said second stable state and from said second stable state to said first stable state, including a differentiator, for producing a train of sharp spikes of large amplitude which accurately marks said transitions; and means for utilizing said train of spikes as a pulse position modulated signal.

References Cited by the Examiner

UNITED STATES PATENTS

| | | | |
|---|---|---|---|
| 2,975,377 | 3/61 | Price et al. | 307—88.5 |
| 2,978,576 | 4/61 | Watters | 307—88.5 |
| 2,986,724 | 5/61 | Jaeger | 331—107 |
| 3,092,734 | 6/63 | Theriault | 307—88.5 |
| 3,096,445 | 7/63 | Herzog | 307—88.5 |

ROY LAKE, *Primary Examiner.*

L. MILLER ANDRUS, ALFRED L. BRODY, *Examiners.*